US010071722B2

(12) United States Patent
Yoshizumi

(10) Patent No.: US 10,071,722 B2
(45) Date of Patent: *Sep. 11, 2018

(54) OPTIMIZING USE STATES OF A HYBRID MOBILE VEHICLE ALONG A DISCRETIZED TRAVEL ROUTE

(71) Applicant: INTERNATIONAL BUSINESS MACHINES CORPORATION, Armonk, NY (US)

(72) Inventor: Takayuki Yoshizumi, Tokyo (JP)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 25 days.

This patent is subject to a terminal disclaimer.

(21) Appl. No.: 15/343,257

(22) Filed: Nov. 4, 2016

(65) Prior Publication Data
US 2017/0050632 A1 Feb. 23, 2017

Related U.S. Application Data

(63) Continuation of application No. 14/748,325, filed on Jun. 24, 2015, now Pat. No. 9,511,770, which is a (Continued)

(30) Foreign Application Priority Data

Mar. 27, 2014 (JP) .................................. 2014-067161

(51) Int. Cl.
B60W 20/12 (2016.01)
G01C 21/34 (2006.01)
(Continued)

(52) U.S. Cl.
CPC ............ *B60W 20/12* (2016.01); *B60W 10/06* (2013.01); *B60W 10/08* (2013.01); *B60W 20/00* (2013.01);
(Continued)

(58) Field of Classification Search
CPC ...... B60W 20/12; B60W 10/06; B60W 10/08; B60W 20/00; B60W 30/18; B60W 50/082;
(Continued)

(56) References Cited

U.S. PATENT DOCUMENTS 9,428,191 B2 * 8/2016 Yoshizumi ............ B60W 30/18
2007/0112475 A1 5/2007 Koebler et al.

FOREIGN PATENT DOCUMENTS

JP 2001298805 A1 10/2001

OTHER PUBLICATIONS

List of IBM Patents or Patent Applictions Treated as Related; (Appendix P), Date Filed Nov. 4, 2016 2 pages.
(Continued)

Primary Examiner — Gertrude Arthur Jeanglaude
(74) Attorney, Agent, or Firm — Cantor Colburn LLP; David Quinn

(57) ABSTRACT

An information processing apparatus includes a generation section configured to generate, from a state of a mobile vehicle in each position obtained by discretizing a traveling route along which the mobile vehicle travels, a state of the mobile vehicle in a next position for each use state of drive means contained in the mobile vehicle; and an optimization section configured to optimize the use state of the drive means in each position based on at least one of states of the mobile vehicle in each position generated by the generation section.

8 Claims, 5 Drawing Sheets

Related U.S. Application Data continuation of application No. 14/641,728, filed on Mar. 9, 2015, now Pat. No. 9,428,191.

(51) Int. Cl.

| | | |
|---|---|---|
| *B60W 30/18* | (2012.01) | |
| *G01C 21/26* | (2006.01) | |
| *G01C 21/36* | (2006.01) | |
| *B60W 50/00* | (2006.01) | |
| *B60W 50/08* | (2012.01) | |
| *B60W 10/06* | (2006.01) | |
| *B60W 10/08* | (2006.01) | |
| *B60W 20/00* | (2016.01) | |
| *G01C 21/20* | (2006.01) | |
| *G06F 19/00* | (2018.01) | |

(52) U.S. Cl.
CPC ........ *B60W 30/18* (2013.01); *B60W 50/0097* (2013.01); *B60W 50/082* (2013.01); *G01C 21/20* (2013.01); *G01C 21/26* (2013.01); *G01C 21/34* (2013.01); *G01C 21/36* (2013.01); *B60W 2550/402* (2013.01); *B60W 2900/00* (2013.01); *B60Y 2200/92* (2013.01); *Y02T 10/7258* (2013.01); *Y02T 10/7275* (2013.01); *Y02T 90/161* (2013.01)

(58) Field of Classification Search
CPC ........ B60W 2550/402; B60W 2900/00; G01C 21/20; G01C 21/26; G01C 21/34; G01C 21/36; B60Y 2200/92; Y02T 10/7258; Y02T 10/7275
USPC ...................................... 701/22, 54, 99, 408
See application file for complete search history.

(56) References Cited

OTHER PUBLICATIONS

Takayuki Yoshizumi, "Optimizing Use States of Hybrid Mobile Vehicle Along a Discretized Travel Route," U.S. Appl. No. 14/641,728, filed Mar. 9, 2015.

Takayuki Yoshizumi, "Optimizing Use States of Hybrid Mobile Vehicle Along a Discretized Travel Route," U.S. Appl. No. 14/748,325, filed Jun. 24, 2015.

Takayuki Yoshizumi, "Optimizing Use States of a Hybrid Mobile Vehicle Along a Discretized Travel Route", U.S. Appl. No. 15/231,980, filed Aug. 9, 2016.

Japanese Office Action entitled "Notification of Reasons for Refusal"; JP Application No. 2016-244338.

\* cited by examiner

OPTIMIZING USE STATES OF A HYBRID MOBILE VEHICLE ALONG A DISCRETIZED TRAVEL ROUTE

DOMESTIC PRIORITY

This application is a Continuation application of U.S. application Ser. No. 14/748,325; filed Jun. 24, 2015; which is a Continuation application of the legally related U.S. application Ser. No. 14/641,728 filed Mar. 9, 2015, issued as U.S. Pat. No. 9,428,191B2 on Aug. 30, 2016, the contents of which are incorporated by reference herein in their entirety; which claims priority to Japanese Patent Application No. 2014-067161, filed Mar. 27, 2014, and all the benefits accruing therefrom under 35 U.S.C. § 119, the contents of which in its entirety are herein incorporated by reference.

BACKGROUND

The present invention relates generally to an information processing apparatus, and more particularly to optimizing use states of a hybrid mobile vehicle along a discretized travel route.

Conventionally, a hybrid car or the like having an engine and an electric motor has been configured to regenerate kinetic energy as electric energy, store the electric energy in a battery or the like, and control the timing of using the regenerative energy to drive the motor using the stored electric energy in order to minimize the time of arrival at a destination and maximize fuel efficiency (for example, see JP2013-123363, JP2009-115466, and JP2005-282569).

SUMMARY

In one embodiment, an information processing apparatus includes a generation section configured to generate, from a state of a mobile vehicle in each position obtained by discretizing a traveling route along which the mobile vehicle travels, a state of the mobile vehicle in a next position for each use state of drive means contained in the mobile vehicle; and an optimization section configured to optimize the use state of the drive means in each position based on at least one of states of the mobile vehicle in each position generated by the generation section.

In another embodiment, an information processing method includes generating, from a state of a mobile vehicle in each position obtained by discretizing a traveling route along which the mobile vehicle travels, a state of the mobile vehicle in a next position for each use state of drive means contained in the mobile vehicle; and optimizing the use state of the drive means in each position based on at least one of states of the mobile vehicle in each position generated in the generation step.

DETAILED DESCRIPTION

Since the possible operating states of a hybrid car (position, speed, residual energy amount, etc.) take on continuous values, dynamic programming cannot be applied as the optimization technique, and the calculation amount in the optimization processing becomes enormous, making it difficult to derive the optimum solution. Further, when considering regenerative energy other than the electric energy, it is more difficult to derive the optimum solution.

In a first aspect of the present invention, there are provided an information processing apparatus including: a generation section for generating, from a state of a mobile vehicle in each position obtained by discretizing a traveling route along which the mobile vehicle travels, a state of the mobile vehicle in the next position for each use state of drive means contained in the mobile vehicle; and an optimization section for optimizing the use state of the drive means in each position based on at least one of the states of the mobile vehicle in each position generated by the generation section, an information processing method, and a program.

While the present invention will be described below in connection with an embodiment, it is to be understood that the embodiment to be described below is not intended to limit the inventions according to the appended claims, and all the combinations of the features described in the embodiment are not necessarily essential to the means for solving the problems.

Figure 1:
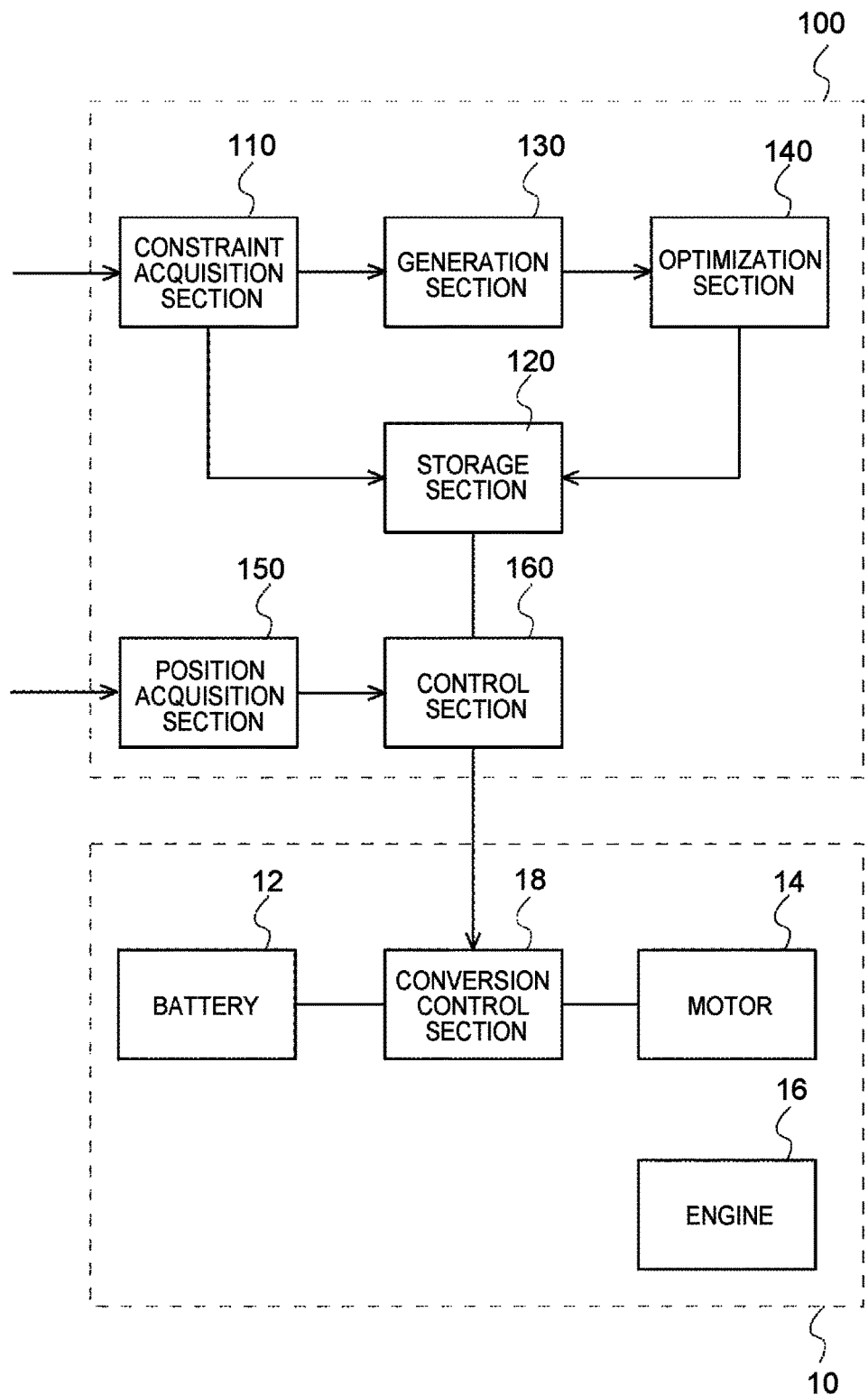
FIG. 1 shows a configuration example of an information processing apparatus according to an embodiment together with a mobile vehicle.

FIG. 1 shows a configuration example of an information processing apparatus 100 according to the embodiment together with a mobile vehicle 10. The information processing apparatus 100 applies dynamic programming based on a discretized traveling route to a destination of the mobile vehicle 10 to minimize the time of arrival at the destination and maximize fuel efficiency. Here, the mobile vehicle 10 is a car equipped with at least one drive means to run by itself to the destination. The mobile vehicle 10 may be a car having, as the drive means, an engine driven by using gasoline or the like as fuel, or a car having, as the drive means, a motor driven by electric energy.

It is desirable that the mobile vehicle 10 be provided with energy storage means with a limited storage amount increased or decreased while the mobile vehicle 10 is traveling to drive the drive means using at least part of the energy stored in the energy storage means. As an example, the mobile vehicle 10 is a car equipped with a battery as the energy storage means and a motor as the drive means. In this case, the battery supplies the stored electric energy to the motor to drive the motor, and stores electric energy regenerated by electric generation or the like from part of kinetic energy caused by the rotation of the motor or the like.

The mobile vehicle 10 may be provided with two or more drive means. As an example, the mobile vehicle 10 is a car equipped with a motor and an engine. In this case, the mobile vehicle 10 is a hybrid car driven by the engine to travel while storing electric energy regenerated by power generation or the like from part of the driven energy to drive the motor using the stored electric energy. As an example, the mobile vehicle 10 is provided with a kinetic energy recovery system (KERS) or the like having a motor/generator unit (MGU-K: Motor Generator Unit-Kinetic) for converting kinetic energy to electric energy.

The mobile vehicle 10 may also regenerate exhaust energy (heat energy) generated by the drive of the engine to electric energy to store the electric energy in a battery and/or drive the motor. As an example, the mobile vehicle 10 is provided with a heat recovery system having a motor/generator unit (MGU-H: Motor Generator Unit-Heat) for converting exhaust energy to electric energy.

In the embodiment, an example in which the mobile vehicle 10 is a hybrid car including a battery 12, a motor 14 and an engine 16, and a conversion control section 18 for converting kinetic energy generated by the drive of the engine 16 into electric energy will be described. Here, as an example, the conversion control section 18 is a kinetic energy recovery system (KERS). The mobile vehicle 10 of the embodiment switches between the drive of the engine 16 and storage of electric energy, the drive of the engine 16 and the motor 14, and the drive of the motor 14 according to a predetermined program or data while being driven by a driver to travel.

Here, for example, the predetermined program or data controls the drive of the mobile vehicle 10 to minimize the amount of time until arrival at a destination input or specified in advance or to make fuel efficiency to the destination become the best. The information processing apparatus 100 generates such a program or data. The information processing apparatus 100 includes a constraint acquisition section 110, a storage section 120, a generation section 130, an optimization section 140, a position acquisition section 150, and a control section 160.

The constraint acquisition section 110 acquires state constraints of the mobile vehicle 10 in each of positions obtained by discretizing a traveling route along which the mobile vehicle 10 travels. The constraint acquisition section 110 may acquire constraint data stored in a predetermined format. The constraint acquisition section 110 may be connected to a network or the like to acquire constraint data through the network. Further, the constraint acquisition section 110 may receive and acquire constraint data sent by wire or wireless.

Here, the constraint acquisition section 110 may acquire, as constraint data, the curvature of a road, the height above a predetermined reference (e.g., altitude or sea level), the length of the road, the frictional force of the road surface, the legal speed, traffic congestion information, and the like. Further, the constraint acquisition section 110 may generate constraints from the acquired road information. The constraint acquisition section 110 supplies the acquired constraint data to the storage section 120.

The storage section 120 is connected to the constraint acquisition section 110 to store the constraint data received from the constraint acquisition section 110. The storage section 120 may also store the program or data generated by the information processing apparatus 100. The storage section 120 may further store data and the like to be processed in the process of generating the program or data. Further, the storage section 120 may supply the stored data to a requestor upon request from each section of the information processing apparatus 100.

The generation section 130 generates, from a state of the mobile vehicle 10 in each of positions obtained by discretizing a traveling route along which the mobile vehicle 10 travels, a state of the mobile vehicle 10 in the next position for each use state of the drive means of the mobile vehicle 10. The generation section 130 calculates, for each use state of the drive means of the mobile vehicle 10, a state of the mobile vehicle 10 in each position having continuous parameter values including at least one of the traveling speed of the mobile vehicle 10, the time to the position or the time of arrival at the position, and the remaining amount of energy of the mobile vehicle 10.

For example, the generation section 130 generates, as a state $S(x)$ of the mobile vehicle 10, a time $t_x$, a speed $v_x$ of the mobile vehicle 10, a position $d_x$ of the mobile vehicle 10, the remaining battery capacity $b_x$, the remaining amount $g_x$ of gasoline, and the like. Further, as an example, the generation section 130 generates a state of the mobile vehicle 10 in the next position for each use state of two drive means, namely the motor 14 and the engine 16, respectively.

The generation section 130 may also generate a state of the mobile vehicle 10 in the next position for each combination of use states of the two or more drive means. In this case, as an example, the generation section 130 generates a state of the mobile vehicle 10 in the next position for each of use states of three drive means, namely the motor 14, the engine 16, and the motor 14 and the engine 16, respectively.

The generation section 130 is connected to the constraint acquisition section 110 or the storage section 120 to receive constraint data in each position and generate a state of the mobile vehicle 10 in the next position from a state of the mobile vehicle 10 in each position under the constraints. For example, the generation section 130 generates a state $S(n)$ of a speed $v_n$, the remaining battery capacity $b_n$, and the like in the next position n from a state $S(m)$ of a speed $v_m$, the remaining battery capacity $b_m$, and the like in a position m, and the constraints such as a change of altitude and the length of a road. The generation section 130 may generate two or more possible states of the mobile vehicle 10.

Based on at least one state of the mobile vehicle 10 in each position generated by the generation section 130, the optimization section 140 optimizes the use state of the drive means in each position. The optimization section 140 may select an optimum state from among multiple states of the mobile vehicle 10 at the destination generated by the generation section 130. For example, the optimization section 140 selects, as the optimum state, a state in which the time of arrival at the destination is minimized or a state in which the remaining amount of gasoline at the destination is greatest.

Then, the optimization section 140 selects a state of the mobile vehicle 10 in each position as leading to the selected state to specify, as the optimum use state, a use state of the drive means corresponding to the selected state in each position. For example, the optimization section 140 identifies a state of the mobile vehicle 10 in each position as leading to the state, in which the time of arrival at the destination generated by the generation section 130 is minimized, as the optimum use state (i.e., the use state in which the time of arrival at the destination is minimized). The optimization section 140 may store the identified use state in the storage section 120.

The position acquisition section 150 acquires the current position of the mobile vehicle 10. The position acquisition section 150 may receive a signal transmitted from an external positioning system such as a GPS to acquire the position of the mobile vehicle 10. Alternatively, the position acquisition section 150 may acquire the position of the mobile vehicle 10 based on the detection results of sensors or cameras installed on a road or the like. Instead, the position acquisition section 150 may acquire the position of the mobile vehicle 10 from the traveling time and traveling speed from the initial position, collation with road information, and the like. Instead, the position acquisition section 150 may have an autonomous navigation system such as an electronic compass for detecting geomagnetism to acquire the current position. The position acquisition section 150 supplies the acquired position information to the control section 160.

The control section 160 is connected to the storage section 120 to acquire the results of optimization by the optimization section 140. The control section 160 is also connected to the position acquisition section 150 to acquire current position information on the mobile vehicle 10. The control section 160 controls the drive means based on a use state corresponding to the current position among the use states of the drive means in each position optimized by the optimization section 140.

The control section 160 is connected to the conversion control section 18 of the mobile vehicle 10 to control the regenerative timing of electric energy in the conversion control section 18 by the motor 14 and the timing of driving the motor 14 by the electric energy. In other words, the control section 160 makes each position on the discretized traveling route corresponding to the current position, and controls the drive of the motor 14 and the engine 16 in the current position using the drive means corresponding to the current position and identified by the optimization section 140.

According to the information processing apparatus 100 of the embodiment mentioned above, the drive of the engine 16 of the mobile vehicle 10 as a hybrid car, the regeneration and storage of electric energy, the drive of the motor 14 by the electric energy, and the switching control such as between the drives of the motor 14 and the engine 16 are optimized in advance to minimize the time of arrival at the destination or improve fuel efficiency. Then, the information processing apparatus 100 switches the drive means to the optimized state while a driver is driving the mobile vehicle 10 to the destination with previously assumed driving operations, such as an estimated passing speed, to perform control in order to minimize the time of arrival at the destination or maximize fuel efficiency to the destination.

Figure 2:
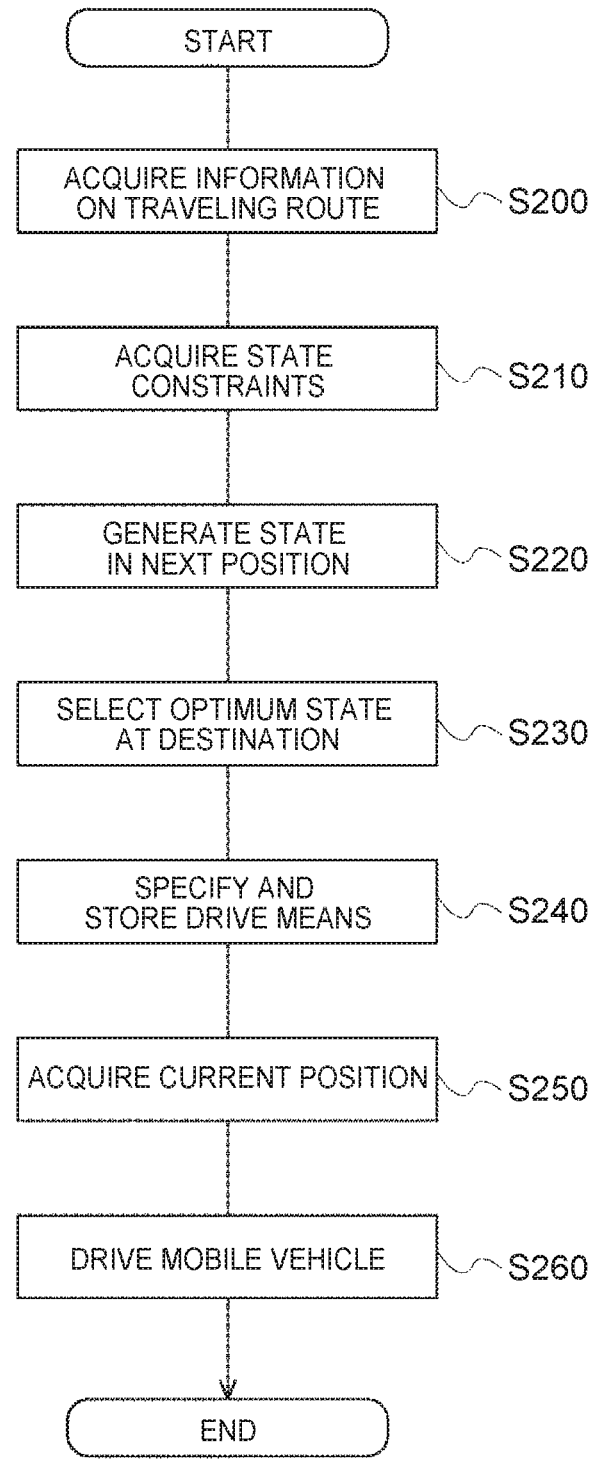
FIG. 2 shows an operation flow of the information processing apparatus according to an embodiment.
Figure 3:
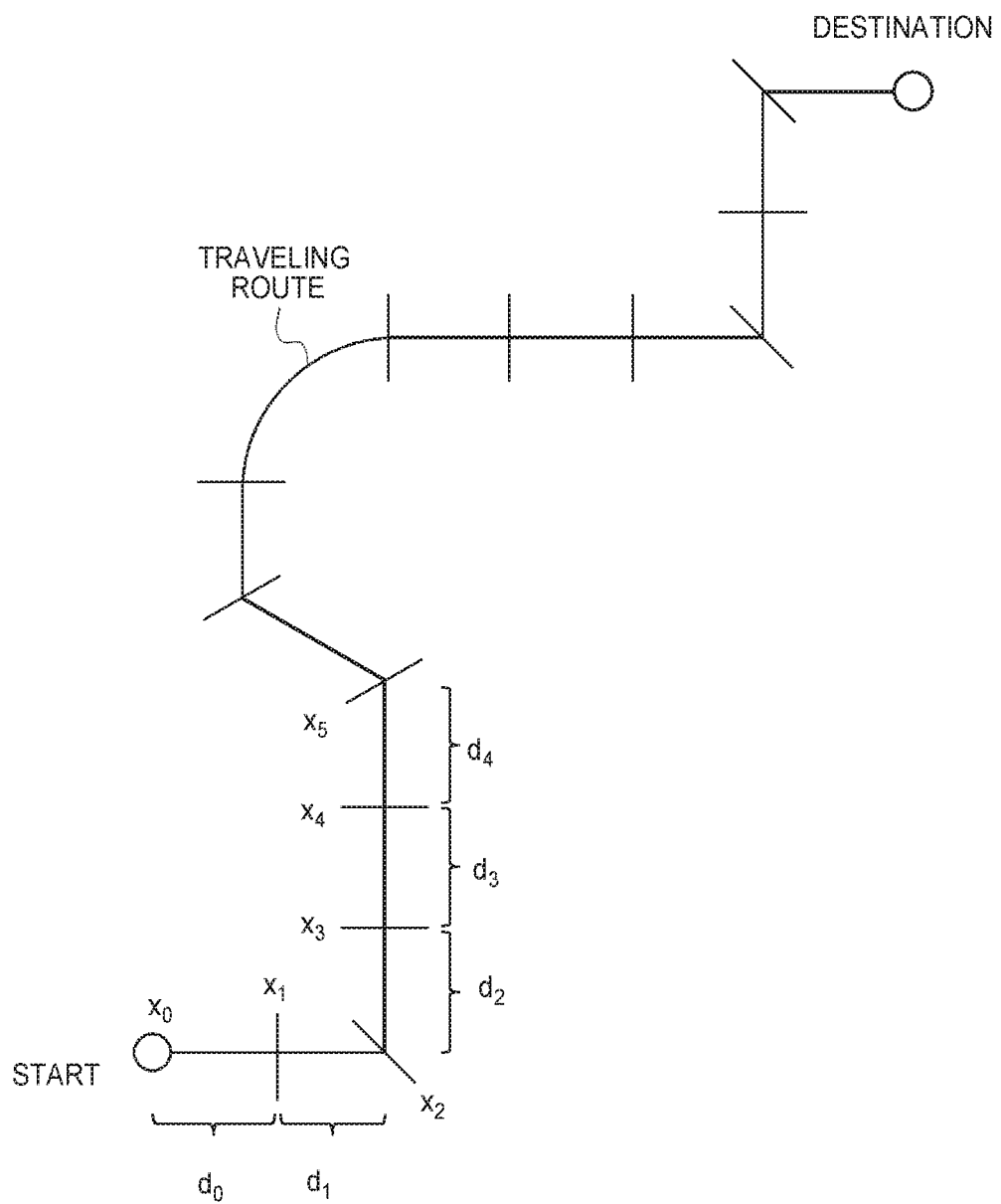
FIG. 3 shows an example of a traveling route of the mobile vehicle according to an embodiment.

The optimization operation of the information processing apparatus 100 and the control operation of the mobile vehicle 10 will be described with reference to FIG. 2. FIG. 2 shows an operation flow of the information processing apparatus 100 according to the embodiment. FIG. 3 shows an example of the traveling route of the mobile vehicle 10 according to the embodiment. Here, an example of the information processing apparatus 100 to execute the operation flow shown in FIG. 2 and perform control to most improve the fuel efficiency of the mobile vehicle 10 traveling on a general road will be described.

First, the constraint acquisition section 110 acquires information on a destination and a traveling route to the destination (S200). For example, the constraint acquisition section 110 acquires information on an input destination and information on a selected traveling route to the destination from a car navigation system or the like installed in the mobile vehicle 10. As an example, the constraint acquisition section 110 acquires information on a destination and a traveling route to the destination shown in FIG. 3.

Next, the constraint acquisition section 110 acquires state constraints of the mobile vehicle in each position of a discretized traveling route (S210). As an example, the constraint acquisition section 110 may acquire the state constraints of the mobile vehicle in each position of the discretized traveling route (e.g., the curvature of a road, the altitude, the length of the road, the width of the road, the number of lanes, the kind of road such as a highway for the exclusive use of cars, the placement of traffic lights, the legal speed, and the like) from a map information database or the like through a network.

Further, the constraint acquisition section 110 may pre-store a correspondence table between weather and the friction coefficient μ of the road surface to acquire the friction coefficient μ of the road surface according to weather information on the traveling route acquired through the network. Further, the constraint acquisition section 110 may acquire traffic congestion information on the traveling route from a car navigation system or the like.

The constraint acquisition section 110 defines constraints assuming that the driver speeds up, slows down, and steers the mobile vehicle 10 in an ordinary way during driving without taking thoughtless driving into consideration, such as abrupt acceleration, sudden starting, meandering, and sudden braking. For example, when there is no traffic congestion, the constraint acquisition section 110 determines the legal speed of the mobile vehicle 10 in each position to be the estimated passing speed. In other words, the constraint acquisition section 110 assumes that the driver speeds up in each position with an ordinary acceleration less than or equal to a predetermined value up to the legal speed, and when the speed reaches the legal speed, the driver drives while maintaining the legal speed.

Thus, the constraint acquisition section 110 assumes that, even when the acceleration (deceleration) is required, the driver will accelerate (decelerate) with normal gas pedal operation (brake operation). Thus, when the mobile vehicle 10 is driven by the engine (driven by the motor) to travel a distance d along a flat road at an average speed v per hour, the gasoline consumption (battery consumption) for the travel can be calculated as being approximately constant.

The constraint acquisition section 110 also assumes that the driver will go around a curve with an ordinary horizontal acceleration (lateral G-force) less than or equal to a predetermined value. In this case, the constraint acquisition section 110 can generate state constraints of the mobile vehicle 10 in each position based on the curvature in each position of the traveling route. Here, if the horizontal acceleration (lateral G-force) given to the mobile vehicle 10 when traveling on a road having a curvature radius r(d) in a position d is denoted by a(d), the following equation will be established, where v(d) denotes the speed of the mobile vehicle 10 in the position d:

$$a(d)=v(d)^2/r(d)$$

$$v(d)=\{r(d)\cdot a(d)\}^{1/2}$$

The constraint acquisition section 110 can set the magnitude of the lateral G-force a(d) caused by the mobile vehicle 10 traveling on a general road to a predetermined (ordinary) value to define an estimated passing speed of the mobile vehicle 10 traveling on the road having the curvature radius r(d) as v(d) of the equation in Math. 1. Here, when the legal speed in the position d is lower than v(d), the constraint acquisition section 110 may set the legal speed as the estimated passing speed.

Further, the constraint acquisition section 110 may acquire a situation of the traveling route to generate state constraints of the mobile vehicle 10 in each position based on the acquired situation of the traveling route. For example, the constraint acquisition section 110 acquires traffic congestion information on the traveling route from a car navigation system and/or a network to set a constraint that the estimated passing speed in a congested section to be lower than or equal to the legal speed. As the distance of the congested section becomes longer, the constraint acquisition section 110 may decrease the estimated passing speed. Further, the constraint acquisition section 110 may set a constraint that the estimated passing speed in a section where there are a large number of traffic lights installed is lower than or equal to the legal speed.

Thus, the constraint acquisition section 110 calculates the upper limit speed in each position, respectively, based on the ordinary acceleration and deceleration, the lateral G-force, the right-turn speed and left-turn speed at an intersection, the curvature a curve along a route, and the situation of the traveling route. Then, when the calculation result drops below the legal speed, the constraint acquisition section 110 adds the calculated upper limit speed to the constraints as the estimated passing speed. As shown in FIG. 3, the constraint acquisition section 110 acquires constraints in positions $x_0$, $x_1$, $x_2$, ..., respectively, and stores the constraints in the storage section 120.

Next, from the state of the mobile vehicle 10 in each position (e.g., position $x_0$), the generation section 130 generates a state of the mobile vehicle 10 in the next position (e.g., position $x_1$) based on the constraints in each position and the use state of the drive means (S220). If the travel distance is $d_{x0}$, the speed is $v_{x0}$, the time is $t_{x0}$, the remaining battery capacity is $b_{x0}$, and the remaining amount of gasoline is $g_{x0}$ in a state $S(x_0)$ of a position $x_0$, the generation section 130 will generate a travel distance $d_{x1}=d_{x0}+\Delta d$, a speed $v_{x1}$, a time $t_{x1}$, a remaining battery capacity $b_{x1}$, and a remaining amount $g_{x1}$ of gasoline in a state $S(x_1)$ of a position $x_1$ a distance $\Delta d$ away from the position $x_0$ according to the constraints in the position $x_0$ and the state of the drive means (e.g., a state of traveling by engine driving).

The generation section 130 may generate a state of the mobile vehicle 10 in the next position based on a physical law. For example, when the mobile vehicle 10 travels at an estimated constant passing speed $v_d$, the generation section 130 sets a traveling time $t_{\Delta d}$ to the next position to a value obtained by dividing the distance $\Delta d$ to the next position by the estimated passing speed $v_d$ ($t_{\Delta d}=\Delta d/v_d$).

In this case, for example, the generation section 130 determines a coefficient for calculating fuel consumption corresponding to the traveling speed and the traveling time in advance from the fuel consumption performance of the mobile vehicle 10, and calculates a gasoline consumption $\Delta g$ when the mobile vehicle 10 is driven by the engine alone. Likewise, the generation section 130 may calculate a battery consumption $\Delta b$ in the case of motor driving alone, and a gasoline consumption $\Delta g$ and a battery consumption $\Delta b$ in the case of a combination of engine and motor driving, respectively.

Further, for example, the generation section 130 calculates a speed $v_{d+\Delta d}$ of the mobile vehicle 10 in the next position from the distance $\Delta d$ by using $\{2\cdot\alpha(v_d)\cdot\Delta d+v_d^2\}^{1/2}$ when the mobile vehicle 10 traveling at the speed $v_d$ speeds up (slows down) with an acceleration $\alpha$ ($v_d$). In this case, the generation section 130 may use the calculated speed $v_{d+\Delta d}$ to calculate the traveling time $t_{\Delta d}$ from $(v_{d+\Delta d}-v_d)/\alpha(v_d)$.

Here, among the multiple states of the mobile vehicle 10 in the next position, which are generated for each of the use states of the drive means contained in the mobile vehicle 10, when the generation section 130 determines that one state is equal or inferior to at least one of the other states in terms of any of the predetermined multiple parameters (elements), the generation section 130 prunes the one state. The generation and pruning of states of the mobile vehicle 10 in the next position by the generation section 130 will be described with reference to FIG. 4.

Figure 4:
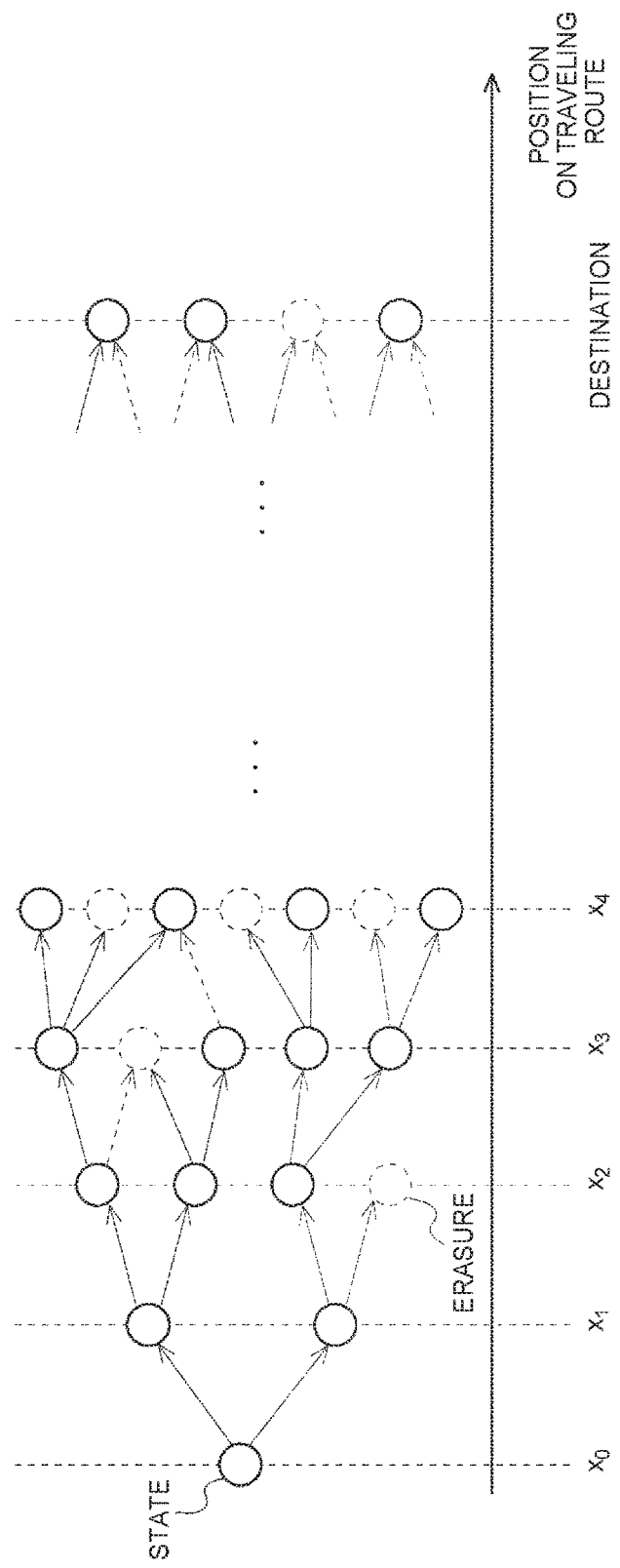
FIG. 4 shows an example of a conceptual structure in which a generation section, according to an embodiment, generates states of the mobile vehicle.

FIG. 4 shows an example of a conceptual structure in which the generation section 130 according to the embodiment generates the states of the mobile vehicle 10. In FIG. 4, the abscissa shows the position on the traveling route of the mobile vehicle 10, indicating one possible state of the mobile vehicle 10 in each position by one circle. Based on the respective states in the respective positions, the generation section 130 generates possible states of the mobile vehicle 10 in the next position (i.e., it generates two or more corresponding circles).

The generation section 130 generates one or more states from one state. Therefore, the number of states generated by the generation section 130 generally increases as the position comes closer to the destination. As a result, the generation section 130 may generate too many states to process.

Therefore, the generation section 130 of the embodiment thins out (prunes) a state(s) obvious not to be selected by the optimization section 140 as the optimum state. For example, the generation section 130 compares, for each element, a generated state A (travel distance $d_A$, speed $v_A$, time $t_A$, remaining battery capacity $b_A$, and remaining amount $g_A$ of gasoline) and a generated state B (travel distance $d_B$, speed $v_B$, time $t_B$, remaining battery capacity $b_B$, and remaining amount $g_B$ of gasoline), and when any of the elements is equal or inferior to the others, the generation section 130 erases a state having the element.

The generation section 130 may also generate almost identical states from multiple states different from one another. In this case, the generation section 130 may compare the times of reaching the almost identical states to erase a transition to a state with a longer reaching time. Thus, the generation section 130 may prune an inter-state transition process as well as the state. As an example, FIG. 4 indicates states pruned by the generation section 130 and transitions between the states by dotted lines.

As an example, when there is a state B with $d_A=d_B$, $v_A>=v_B$, $t_A<=t_B$, $b_A>=b_B$, and $g_A>=g_B$, the generation section 130 determines that a state A dominates over the state B (all the elements of the state B are equal or inferior to the elements of the state A), and erases the state B. Thus, when a newly generated state is dominated by any of already generated states, the generation section 130 can erase the newly generated state. Further, when the newly generated state dominates over any of the already generated states, the generation section 130 can erase the already generated state dominated by the newly generated state.

Since the generation section 130 prunes states, unselected as the optimum state, dominated by other states while generating possible states of the mobile vehicle 10, useless processing for generating a new state from a state inferior to other states can be eliminated. This allows the generation section 130 to generate possible states (states that are likely to be selected as the optimum state) of the mobile vehicle 10 for each use state of the drive means until reaching a position corresponding to the destination. In other words, the generation section 130 forms a tree structure of multiple states connected from a state in a traveling start position to multiple states at the destination.

Next, the optimization section 140 selects an optimum state from among the multiple states of the mobile vehicle 10 at the destination generated by the generation section 130 according to the conditions for optimizing the mobile vehicle 10 (S230). In this example, since the mobile vehicle 10 is controlled to most improve the fuel efficiency, the optimization section 140 selects a state with the greatest remaining amount g of gasoline from among the multiple states of the mobile vehicle 10 at the destination.

Then, the optimization section 140 sets a use state of the drive means, corresponding to a state of the mobile vehicle 10 in each position from the state at the start position to the selected state at the destination, as the optimum use state of the drive means in each position. In other words, the optimization section 140 identifies the drive means in each position from the state at the start position to the selected state at the destination as any corresponding one of the three driving patterns, namely driving by the motor 14, driving by the engine 16, or driving by the motor 14 and the engine 16.

The optimization section 140 stores, in the storage section 120, the identified drive means in each position (S240). The optimization section 140 may also store, in the storage section 120, the optimized state of the mobile vehicle 10 in each position in association with the drive means. The optimization section 140 may further generate a driving program for driving the mobile vehicle 10 according to the identified drive means in each position. As mentioned above, the information processing apparatus 100 of the embodiment can identify the optimum drive means corresponding to the traveling route to the destination. Thus, when the driver actually drives the mobile vehicle 10, the information processing apparatus 100 controls the drive of the mobile vehicle 10 based on the identified drive means.

Next, the position acquisition section 150 acquires the current position of the mobile vehicle 10 (S250). The control section 160 identifies a position on a discretized traveling route corresponding to the position acquired by the position acquisition section 150. Then, the control section 160 controls the conversion control section 18 according to the identified drive means in the position corresponding to the current position to drive the mobile vehicle 10 (S260). Here, when the optimization section 140 generates a driving program, the control section 160 can execute the driving program to drive the mobile vehicle 10.

As an example, when the driver finishes entering data up to the destination while the mobile vehicle 10 is parked at a traveling start point, the information processing apparatus 100 completes the optimization of the drive means up to the destination, and the control section 160 identifies the present location as the initial position $x_0$ on the traveling route. The control section 160 controls the conversion control section 18 according to the drive means in the position $x_0$, which is identified by the optimization, to drive the mobile vehicle 10 by the drive means until the mobile vehicle 10 moves to the position $x_1$.

For example, in the case of driving by the motor 14 as the drive means in the position $x_0$, the control section 160 controls the conversion control section 18 to drive by the motor. Further, when the mobile vehicle 10 has passed through the position $x_1$, the control section 160 controls the conversion control section 18 to drive the mobile vehicle 10 by the next drive means corresponding to a section until moving to a position $x_2$.

Each time the mobile vehicle 10 travels and passes through each corresponding discretized position, the control section 160 switches to drive means corresponding to the position and continues the control until the mobile vehicle 10 arrives at the destination. Thus, if the driver drives the mobile vehicle 10 with ordinary acceleration, deceleration, and lateral G-force, and at ordinary right-turn speed and left-turn speed at an intersection, and the legal speed, the mobile vehicle 10 will replicate a state close to the optimized traveling state in each position identified by the information processing apparatus 100. Therefore, when arriving at the destination, the mobile vehicle 10 gets into a state close to the state with the greatest remaining amount g of gasoline, i.e., the information processing apparatus 100 can maximize the efficiency of fuel consumed up to the destination.

As described above, the information processing apparatus 100 generates possible states of the mobile vehicle 10 while pruning a state(s) in each of the positions obtained by discretizing the traveling route, and applies dynamic programming for optimization so that the optimum driving method can be identified for each position. Further, the information processing apparatus 100 controls the regenerative timing of the mobile vehicle 10 and the driving timing of the motor based on the identified driving method so that the mobile vehicle 10 can be driven to the destination by the optimized driving method.

The above description has been made of the case where the information processing apparatus 100 according to the embodiment switches the driving of the mobile vehicle 10 to any of the driving patterns, namely driving by the engine 16 and storage of electric energy, driving by the engine 16 and the motor 14, or driving by the motor 14. Alternatively, the information processing apparatus 100 may discretize the driving operation of the engine 16 and the motor 14 to optimize the traveling of the mobile vehicle 10 to the destination by using finer driving states.

In this case, the generation section 130 discretizes the use state of the drive means to generate a state of the mobile vehicle 10 in the next position for each of discretized multiple use states. As an example, the generation section 130 uses use states obtained by dividing the drive of the motor 14 and the engine 16 from 0% to 100% into eleven steps, respectively.

In other words, the generation section 130 generates states of the mobile vehicle 10 in the next position for use states discretized into a total of 121 combinations, where there is 11 ways as a drive ratio between the motor 14 and the engine 16. The control section 160 discretizes and controls the drive means of the mobile vehicle 10 according to the use states obtained by discretizing the drive means in this way so that the mobile vehicle 10 can travel to the destination by the optimized driving method.

The above description has been made of the case where the information processing apparatus 100 according to the embodiment is of a hybrid type using the motor 14 and the engine 16 as the drive means to optimize the mobile vehicle 10 having the MGU-K for converting kinetic energy to electric energy. Alternatively, the information processing apparatus 100 may optimize a mobile vehicle 10 having three or more drive means and/or two or more energy regeneration means.

For example, the information processing apparatus 100 may have the MGU-H for converting exhaust energy to electric energy to optimize, in the same way, the mobile vehicle 10 for storing, in the battery 12, electric energy regenerated by the MGU-H, driving the motor 14, and/or driving a supercharger of the engine 16. Although the number of possible states of the mobile vehicle 10 increases as the number of driving methods and energy regeneration means increase, since the generation section 130 of the embodiment prunes a state(s) inferior to other states while generating possible states of the mobile vehicle 10 to reduce the number of states, the optimization processing can be performed promptly.

The above description has been made of the case where the information processing apparatus 100 according to the embodiment is such that the constraint acquisition section 110 acquires information on the destination entered. Alternatively, the constraint acquisition section 110 may acquire information on a predetermined destination and a traveling route to the destination.

The constraint acquisition section 110 may acquire information on a commuting route of a user driving to the same destination substantially in the same time zone. In this case, the constraint acquisition section 110 may generate state constraints of the mobile vehicle 10 in each position based on a history about the fact that the mobile vehicle 10 has passed through at least part of the traveling route. In this case, the constraint acquisition section 110 may use the constraints generated in the past. Further, as a result of actually controlling the driving of the mobile vehicle 10 by the control section 160, the constraint acquisition section 110 may store the obtained fuel efficiency or the like in association with the generated constraints to adopt constraints with the highest fuel efficiency or generate constraints with heavier weighting for the next travel.

The above description has been made of the example in which the information processing apparatus 100 according to the embodiment optimizes the mobile vehicle 10 to most improve the fuel efficiency. Alternatively, the information processing apparatus 100 may optimize the mobile vehicle 10 to minimize the arrival time at the destination. The information processing apparatus 100 may also optimize the mobile vehicle 10 to minimize or maximize the consumption of electric energy to the destination. The optimization section 140 can select an optimum state, which meets the conditions to be optimized, from among the multiple states of the mobile vehicle 10 at the destination generated by the generation section 130 to optimize the mobile vehicle 10 according to the conditions.

The above description of the information processing apparatus 100 according to the embodiment has been made of the example in which the mobile vehicle 10 travels on a general road. Alternatively, the information processing apparatus 100 may optimize the use state of the drive means of a mobile vehicle 10 traveling on a circuit or the like with a traveling route and a goal predefined like auto sports.

In this case, the constraint acquisition section 110 acquires information on the traveling route such as a circuit and the goal (destination), and state constraints of the mobile vehicle in each discretized position of the traveling route. Then, the constraint acquisition section 110 defines constraints on the assumption of acceleration, deceleration, and steering to drive the mobile vehicle 10 at the upper limit speed in each position in consideration of ordinary driving in auto sports, such as abrupt acceleration, abrupt deceleration, and sudden braking, when a driver drives the mobile vehicle 10.

The constraint acquisition section 110 assumes the maximum acceleration at full throttle when traveling on a straight road. The constraint acquisition section 110 also assumes the traveling at the maximum speed in each position when passing through each position on the traveling route.

For example, when the mobile vehicle 10 travels on a road having a curvature radius r(d) in a position d at the maximum passing speed $v_{max}$, the following equation is established, where the horizontal acceleration (lateral G-force) is denoted by a(d):

$$m \cdot a(d) = m \cdot v_{max}(d)^2 / r(d) = \mu \cdot m \cdot g$$

$$v_{max}(d) = (\mu \cdot r(d) \cdot g)^{1/2}$$

Thus, the constraint acquisition section 110 may calculate the maximum passing speed $v_{max}$ from the friction coefficient μ and the curvature of a curve to define a constraint as the upper limit speed. Further, when the mobile vehicle 10 is slowed down in a position of a curve having a large curvature, the constraint acquisition section 110 may lower the upper limit speed in a position before the position on the traveling route. In other words, the constraint acquisition section 110 drives the mobile vehicle 10 in the position having the large curvature after starting the deceleration of the mobile vehicle 10 beforehand, thus improving the cornering speed as a whole.

The constraint acquisition section 110 may calculate the maximum passing speed $v_{max}$ in the position d, for example, according to the following equation, where α(v) denotes the maximum deceleration at a speed v as a parameter indicative of the brake performance of the mobile vehicle 10, and when the brake performance is constant regardless of the speed, α(v) may be a predetermined constant:

$$v_{max}(d) = \min\{v_{max}(d),$$

$$v_{max}(d+\Delta d) + \alpha(v_{max}(d+\Delta d)) \cdot \Delta d / v_{max}(d+\Delta d)\}$$

Thus, according to the speed constraint $v_{max}(d+\Delta d)$ in one position, the constraint acquisition section 110 may define a speed constraint $v_{max}(d)$ in a position before the one position, and next define the constraint $v_{max}(d-\Delta d)$ according to the constraint $v_{max}(d)$. This allows the constraint acquisition section 110 to determine a position, at which the mobile vehicle 10 starts the brake operation, in advance.

The constraint acquisition section 110 may also acquire the situation of the traveling route, such as a variation in the friction coefficient μ of the road surface due to a change in weather conditions to generate state constraints of the mobile vehicle 10 in each position. Further, the constraint acquisition section 110 may acquire the situation of the mobile vehicle 10, such as a change in the weight m due to a reduction in the remaining amount of gasoline in a gasoline tank as a result of being consumed by traveling (or an increase in the remaining amount of gasoline as a result of refueling) to generate state constraints of the mobile vehicle 10 in each position.

Then, the generation section 130 generates, from the state of the mobile vehicle 10 in each position, a state of the mobile vehicle 10 in the next position based on the constraints and the use state of the drive means in each position. The generation section 130 prunes a state(s), unselected as the optimum state, dominated by other states while generating possible states of the mobile vehicle 10 to generate states up to the destination.

The optimization section 140 selects a state with the minimum arrival time from among multiple states of the mobile vehicle 10 at the destination to identify the drive means in each position. Thus, the information processing apparatus 100 can optimize the drive means to drive the mobile vehicle 10 to travel in the minimum time along a traveling route with predetermined traveling route and goal. Further, when the driver drives the mobile vehicle 10 to travel along the traveling route in the minimum time, the information processing apparatus 100 can drive the mobile vehicle 10 by the optimized driving method to travel to the destination in the minimum time.

The above description has been made of the case where the information processing apparatus 100 according to the embodiment includes the constraint acquisition section 110, the storage section 120, the generation section 130, the optimization section 140, the position acquisition section 150, and the control section 160. Alternatively, the information processing apparatus 100 may be divided into a specification device including the constraint acquisition section 110, the storage section 120, the generation section 130, and the optimization section 140 to specify drive means in which the traveling of the mobile vehicle 10 to the destination is optimized, and a drive control device including the storage section 120, the position acquisition section 150, and the control section 160 to control the drive of the mobile vehicle 10 by the optimized drive means. In this case, for example, the drive control device installed in the mobile vehicle 10 can control the mobile vehicle 10 using the drive means specified by an external specification device for the mobile vehicle 10.

The above description has been made of the case where the constraint acquisition section 110 in the information processing apparatus 100 according to the embodiment acquires information on the discretized traveling route. Alternatively, the constraint acquisition section 110 may discretize a traveling route when acquiring information on the traveling route to a destination. The constraint acquisition section 110 may discretize the traveling route at predetermined distance intervals, or may discretize the traveling route according to the positions, such as the start point and end point of a curve, instead.

Thus, the traveling route is so discretized that the constraint acquisition section 110 can generate constraints in each of discretized positions sequentially, or the generation section 130 can generate states of the mobile vehicle 10 in each of the discretized positions and prune a state(s) generated in each discretized position. Thus, the generation section 130 can discretize and calculate an attribute set (i.e., traveling route) for identifying a state of the mobile vehicle 10 according to dynamic programming while handling other attribute sets (i.e., each element representing the state of the mobile vehicle 10, and the like) directly as actual numbers without being discretized. This allows the information processing apparatus 100 to minimize the number of parameters to be handled after being discretized in order to optimize the drive means of the mobile vehicle 10 while reducing discretization errors.

Figure 5:
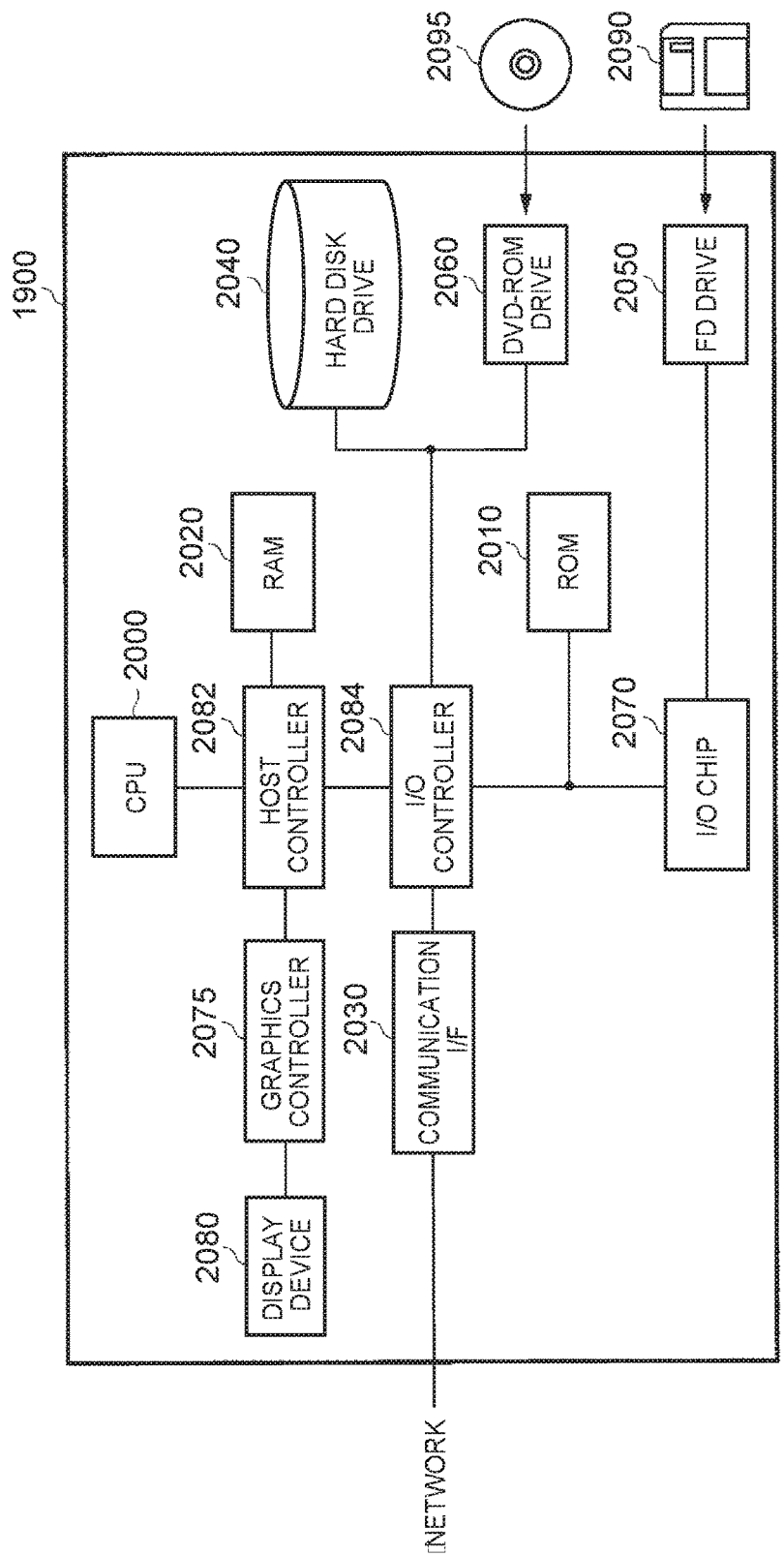
FIG. 5 shows an example of the hardware configuration of a computer functioning as the information processing apparatus according to an embodiment.

FIG. 5 shows an example of the hardware configuration of a computer 1900 functioning as the information processing apparatus 100 according to the embodiment. The computer 1900 according to the embodiment includes: a CPU peripheral section having a CPU 2000, a RAM 2020, and a graphics controller 2075, which are interconnected by a host controller 2082; a display device 2080; an I/O section having a communication interface 2030, a hard disk drive 2040, and a DVD drive 2060, which are connected to the host controller 2082 through an I/O controller 2084; and a legacy I/O section having a ROM 2010, a flexible disk drive 2050, and an I/O chip 2070 connected to the I/O controller 2084.

The host controller 2082 connects the RAM 2020 to the CPU 2000 and the graphics controller 2075 which access the RAM 2020 at a high transfer rate. The CPU 2000 operates based on programs stored in the ROM 2010 and the RAM 2020 to control each section. The graphics controller 2075 acquires image data generated on a frame buffer provided in the RAM 2020 by the CPU 2000 or the like, and displays the image on the display device 2080. Alternatively, the graphics controller 2075 may include therein a frame buffer for storing image data generated by the CPU 2000 or the like.

The I/O controller 2084 connects the host controller 2082 to the communication interface 2030, the hard disk drive 2040, and the DVD drive 2060 as relatively high-speed I/O units. The communication interface 2030 communicates with other apparatuses through a network. The hard disk drive 2040 stores programs and data used by the CPU 2000 in the computer 1900. The DVD drive 2060 reads a program or data from a DVD-ROM 2095 and provides the read program or data to the hard disk drive 2040 through the RAM 2020.

Also connected to the I/O controller 2084 are relatively low-speed I/O units, i.e. the ROM 2010, the flexible disk drive 2050, and the I/O chip 2070. The ROM 2010 stores a boot program executed when the computer 1900 starts, and/or programs depending on the hardware of the computer 1900. The flexible disk drive 2050 reads a program or data from the flexible disk 2090, and provides the program or data to the hard disk drive 2040 through the RAM 2020. The I/O chip 2070 connects not only the flexible disk drive 2050 to the I/O controller 2084, but also various I/O devices to the I/O controller 2084 through a parallel port, a serial port, a keyboard port, and a mouse port, for example.

A program provided to the hard disk drive 2040 through the RAM 2020 is provided by a user in the form of being stored on a recording medium, such as a flexible disk 2090, a DVD-ROM 2095, or an IC card. The program is read from the recording medium, installed on the hard disk drive 2040 in the computer 1900 through the RAM 2020, and executed by the CPU 2000.

The program is installed on the computer 1900 to cause the computer 1900 to function as the constraint acquisition section 110, the storage section 120, the generation section 130, the optimization section 140, the position acquisition section 150, and the control section 160.

Information processing described in the program is read into the computer 1900 to function as specific means implemented by software in cooperation with the above-mentioned various hardware resources, i.e., as the constraint acquisition section 110, the storage section 120, the generation section 130, the optimization section 140, the position acquisition section 150, and the control section 160. Then, information is computed or processed by the specific means depending on the intended use of the computer 1900 in the embodiment, thus building the information processing apparatus 100 according to the intended use.

As an example, when the computer 1900 communicates with an external device, the CPU 2000 executes a communication program loaded on the RAM 2020 to instruct the communication interface 2030 to perform communication processing based on the processing content described in the communication program. Under the control of the CPU 2000, the communication interface 2030 reads send data stored in a send buffer area or the like provided in a storage device, such as the RAM 2020, the hard disk drive 2040, the flexible disk 2090, or the DVD-ROM 2095, to send the data to a network, or writes receive data received from the network into a receive buffer area provided in the storage device. Thus, the communication interface 2030 may transfer data exchanged with the storage device by the DMA (Direct Memory Access) method. Alternatively, the CPU 2000 may read data from the storage device or the communication interface 2030 as a source, and write the data to the communication interface 2030 or the storage device as a destination to transfer the send/receive data.

Further, the CPU 2000 reads, into the RAM 2020, all or necessary part of files or databases stored in an external storage device, such as the hard disk drive 2040, the DVD drive 2060 (DVD-ROM 2095), or the flexible disk drive 2050 (flexible disk 2090) by means of DMA transfer or the like to perform various processing on the data stored in the RAM 2020. Then, the CPU 2000 writes the processed data back to the external storage device by means of DMA transfer or the like. In such processing, the RAM 2020 can be considered to be a temporary storage of the content of the external storage device. Therefore, in the embodiment, the RAM 2020, the external storage device, and the like are collectively referred to as the memory, the storage section, or the storage device. Various programs in the embodiment and various kinds of information such as data, tables, and databases are stored in such a storage device as targets of information processing. Note that the CPU 2000 can also hold part of the content of the RAM 2020 in a cache memory to perform reading and writing in the cache memory. Even in such a form, since the cache memory serves as part of the function of the RAM 2020, the cache memory shall be included in the RAM 2020, the memory, and/or the storage device in the embodiment unless otherwise denoted distinctively.

Further, the CPU 2000 performs various processing on the data read from the RAM 2020 as specified in a sequence of instructions of a program, including various arithmetic operations, information processing, conditional determinations, and processing for searching and replacing information described in the embodiment, and writes the processed data back to the RAM 2020. For example, when a conditional determination is made, the CPU 2000 compares any of various variables shown in the embodiment with any other variable or constant to determine whether it meets a condition, such as larger, smaller, not less than, not more than, or equal to, and when the condition is satisfied (or unsatisfied), the procedure branches to a different sequence of instructions or calls a subroutine.

Further, the CPU 2000 can retrieve information stored in a file or a database in the storage device. For example, when multiple entries are stored in the storage device in such a manner to associate the attribute value of a second attribute with the attribute value of a first attribute, the CPU 2000 searches the multiple entries stored in the storage device for an entry matching with the condition in which the attribute value of the first attribute is specified to read the attribute value of the second attribute stored in the entry so that the attribute value of the second attribute associated with the first attribute that meets a predetermined condition can be obtained.

The above-mentioned programs or modules may be stored on an external recording medium. As the recording media, an optical recording medium such as DVD, Blu-ray (registered trademark), or CD, a magnetooptical recording medium such as MO, a tape medium, and a semiconductor memory such as an IC card can be used in addition to the flexible disk 2090 and the DVD-ROM 2095. Further, a storage device such as a hard disk or a RAM provided in a server system connected to a private communication network or the Internet may also be used as a recording medium to provide a program to the computer 1900 through the network.

While the present invention has been described with reference to the embodiment, the technical scope of the present invention is not limited to the description of the aforementioned embodiment. It will be obvious to those skilled in the art that various changes and modifications can be added to the aforementioned embodiment. From the appended claims, it will also be obvious that forms to which such changes or modifications are added shall be included in the technical scope of the present invention.

The operations, the procedure, the steps, and the execution sequence of processes such as stages in the apparatus, system, program, and method described in the appended claims and the specification and shown in the accompanying drawings are not particularly specified as "ahead of," "prior to," or the like. It should be noted that the operations and the like can be carried out in any order unless the output of the previous process is used in the subsequent process. In the appended claims, the specification, and the operation flow in the drawings, "first," "next," and the like are used for convenience sake, but it does not mean that it is imperative to carry out the operations and the like in this order.

| Reference Signs List | |
|---|---|
| 10 | mobile vehicle |
| 12 | battery |
| 14 | motor |
| 16 | engine |
| 18 | conversion control section |
| 100 | information processing apparatus |
| 110 | constraint acquisition section |
| 120 | storage section |
| 130 | generation section |
| 140 | optimization section |
| 150 | position acquisition section |
| 160 | control section |
| 1900 | computer |
| 2000 | CPU |
| 2010 | ROM |
| 2020 | RAM |
| 2030 | communication interface |
| 2040 | hard disk drive |
| 2050 | flexible disk drive |
| 2060 | DVD drive |
| 2070 | I/O chip |
| 2075 | graphics controller |
| 2080 | display device |
| 2082 | host controller |
| 2084 | I/O controller |
| 2090 | flexible disk |
| 2095 | DVD-ROM |

The invention claimed is:

1. An information processing method, comprising:
generating, from a state of a mobile vehicle in each position obtained by discretizing a traveling route along which the mobile vehicle travels, a state of the mobile vehicle in a next position for each use state of drive means contained in the mobile vehicle;
optimizing the use state of the drive means in each position based on at least one of states of the mobile vehicle in each position generated in the generation step; and
acquiring state constraints of the mobile vehicle in each position obtained by discretizing the traveling route along which the mobile vehicle travels.

2. The method of claim 1, further comprising calculating, for each use state of the drive means contained in the mobile vehicle, a state of the mobile vehicle in each position having continuous parameter values including at least one of a traveling speed of the mobile vehicle, a time to the position or a time of arrival at the position, and a remaining amount of energy in the mobile vehicle.

3. The method of claim 1, wherein among a plurality of states of the mobile vehicle in the next position generated for each use state of the drive means contained in the mobile vehicle, when one state is equal or inferior to at least one of the other states in terms of any of a plurality of predetermined parameters, the generation section prunes the one state.

4. The method of claim 1, further comprising:
selecting an optimum state from among a plurality of states of the mobile vehicle at a destination generated by the generation section; and selecting a state of the mobile vehicle in each position as leading to the selected state to identify, as an optimum use state, a use state of the drive means corresponding to the selected state in each position.

5. The method of claim 1, further comprising generating a state of the mobile vehicle in the next position for each combination of use states of a plurality of the drive means.

6. The method of claim 1, further comprising discretizing use states of the drive means to generate a state of the mobile vehicle in the next position for each of a plurality of discretized use states.

7. The method of claim 1, further comprising generating state constraints of the mobile vehicle in each position based on a curvature in each position of the traveling route.

8. The method of claim 1, further comprising generating state constraints of the mobile vehicle in each position based on a history of passing through at least a part of the traveling route.

\* \* \* \* \*